United States Patent [19]

Jenkins

[11] Patent Number: 4,669,762

[45] Date of Patent: Jun. 2, 1987

[54] DUAL DUCT CONNECTOR

[76] Inventor: James H. Jenkins, 6010 N. 26th St., Arlington, Va. 22207

[21] Appl. No.: 794,766

[22] Filed: Nov. 4, 1985

[51] Int. Cl.⁴ .............................................. A16L 25/00
[52] U.S. Cl. .................................... 285/331; 285/286; 285/371; 285/424
[58] Field of Search ............... 285/331, 424, 371, 398, 285/286; 138/155, DIG. 4, DIG. 11, 156, 157, 158; 428/148; 52/738, 461; 228/173.6

[56] References Cited

U.S. PATENT DOCUMENTS

| | | | |
|---|---|---|---|
| 442,837 | 12/1890 | Ward | 285/398 X |
| 1,450,826 | 4/1923 | Walten | 138/DIG. 4 X |
| 1,762,766 | 6/1930 | Goray | 285/331 |
| 2,189,159 | 2/1940 | Anschicks | 285/424 X |
| 2,360,159 | 10/1944 | Peck | 285/398 X |
| 3,483,665 | 12/1969 | Miller | 52/461 |
| 3,512,805 | 5/1970 | Glatz | 285/331 X |
| 3,796,057 | 3/1974 | Dougherty | 285/331 X |

Primary Examiner—Dave W. Arola

[57] ABSTRACT

A connector to receive the top and bottom member of a duct system.

3 Claims, 5 Drawing Figures

U.S. Patent  Jun. 2, 1987  4,669,762
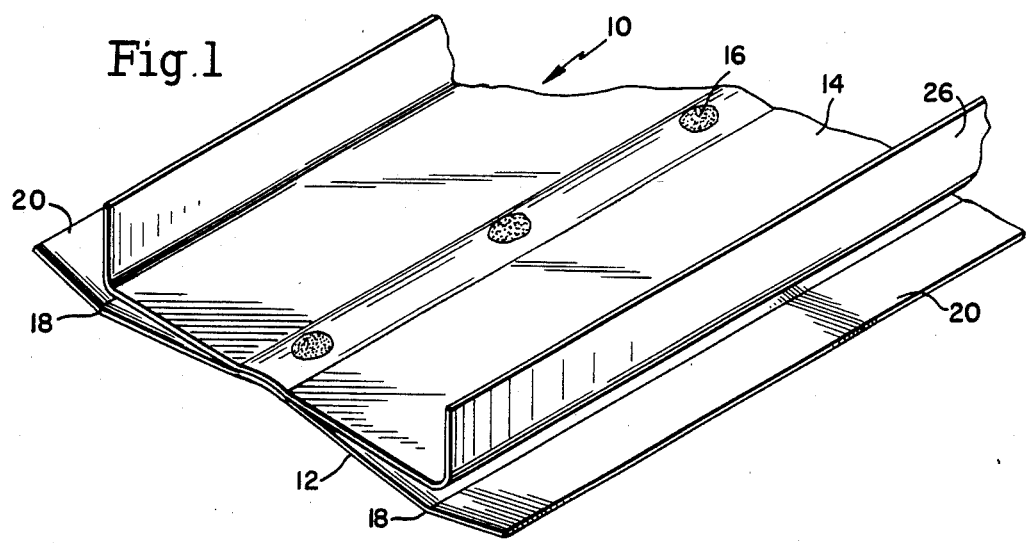
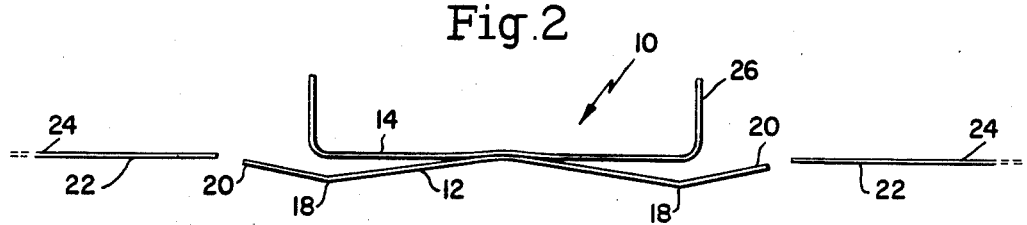
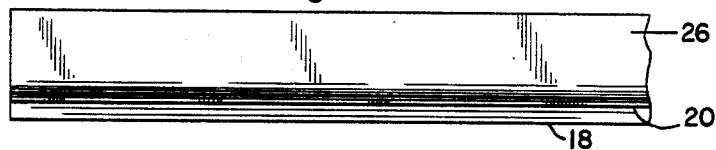
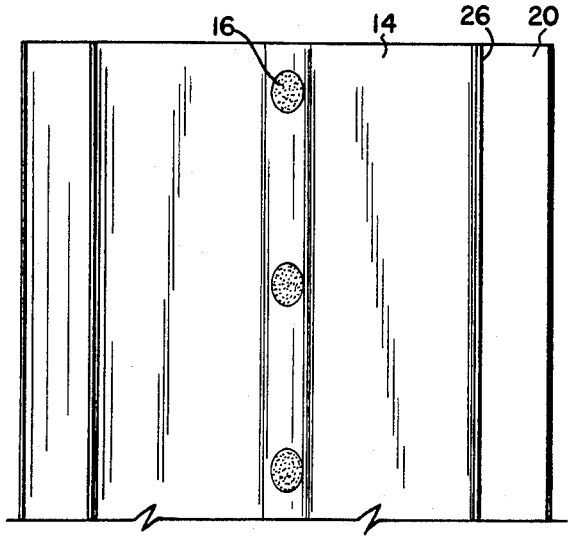 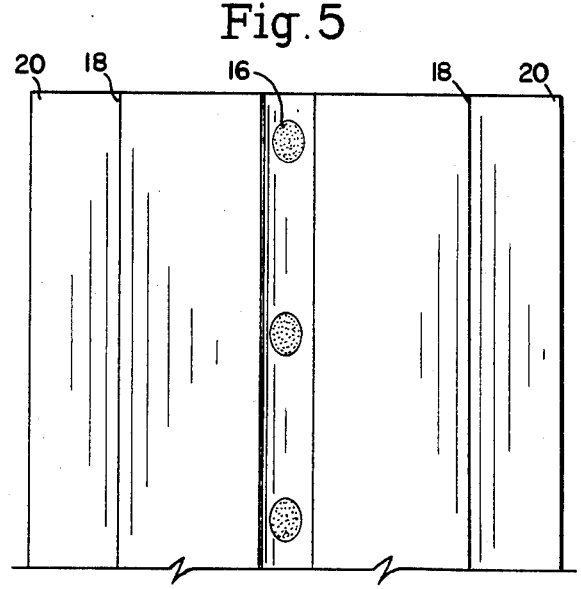

DUAL DUCT CONNECTOR

BACKGROUND OF THE INVENTION

The present invention generally relates to a connector for ducts and more specifically to a connector which includes inner and outer strips secured together at their central portions and having a width to bridge the space between aligned ducts with the inner strip having side edges fitting into an end of a duct and each side edge includes an outwardly facing shallow angulated portion and terminal ends thereon for sealing contact with the inner surface of the duct. The outer strip engages the outer surface of the duct to retain the terminal ends of the angulated portions on the inner strip in sealing contact with the inner surface of the duct.

SUMMARY OF THE INVENTION

An object of the present invention is to provide a connector that can be quickly and easily installed between adjacent ends of aligned ducts to provide an effective mechanical connection as well as an effective air seal between adjacent ends of aligned ducts without requiring the use of tools or special skills.

Another object of this invention is to provide a connector in accordance with the preceding object in which the inner strip includes spaced outwardly facing shallow angulated portions and terminal ends which sealingly engage the inner surface of the duct and the outer strip engages the outer surface of the duct to hold the terminal ends on the inner strip against the inner surface of the duct for maintaining a good air seal.

These together with other objects and advantages which will become apparent reside in the details of construction and operation as more fully hereinafter described and claimed, reference being had to the accompanying drawings forming a part hereof.

BRIEF DESCRIPTION OF THE DRAWINGS

FIG. 1 is a perspective view of the connector of the invention.

FIG. 2 is an end view thereof.

FIG. 3 is a side elevational view thereof.

FIG. 4 is a top plan view thereof.

FIG. 5 is a bottom plan view thereof.

DESCRIPTION OF THE PREFERRED EMBODIMENT

Referring now to the drawings, the connector of the present invention is generally designated by numeral 10 and includes an inner member 12 and an outer member 14 both of which are in the form of a strip of sheet metal. The strips have central portions which are joined together by spot welding 16 or the like. The inner strip 12 includes shallow outwardly facing angulated portions 18 which are spaced from the central portions and which terminate in ends 20 which engage the inner surface 22 of adjacent aligned ducts 24 in good sealed relationship.

The outer strip 14 includes a central portion and outer side edges 26 having outwardly extending flanges which reinforce the connector 10 and the ducts 24. Also, the edges 26 engage the outer surface of the ducts 24 in opposed relation to the terminal ends 20 and retains the terminal ends in sealing engagement with the inner surface 22 of the ducts 24.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is new is claimed as follows:

1. A connector for sealingly connecting adjacent ends of aligned ducts comprising an inner member of sheet material in the form of an elongated strip having a central portion and a width to bridge the space between the adjacent ends of the ducts, each side edge of said strip which fits into an end of a duct including a shallow angulated portion facing outwardly and having terminal ends thereon for sealing contact with the inner surface of the end of each duct at areas spaced from said central portion and extending throughout the length of said strip, an outer member, and means securing said outer member to said central portion of said inner member, said outer member being coextensive with said inner member, said outer member having side edges in opposed relation to the central portion of the inner member for engagement with the outer surface of the duct to retain the terminal ends of the angulated portion of the inner member in sealing contact with the inner surface of the duct.

2. The connector of claim 1 wherein the inner surface of said inner member is substantially smooth with the angulated portions presenting shallow inclined surfaces to air flow through the duct.

3. The connector of claim 1 wherein said outer member includes outwardly extending flanges to reinforce said connector and adjacent ends of the ducts.

* * * * *